Jan. 5, 1943.　　　M. A. WACHS　　　2,307,174
POWER TRANSMISSION GEARING
Filed Dec. 13, 1941
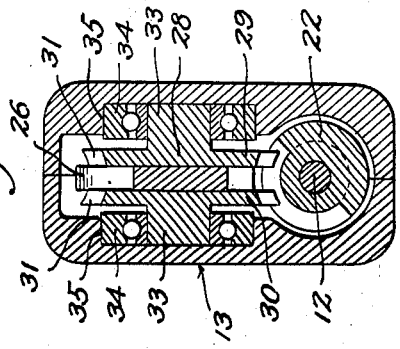
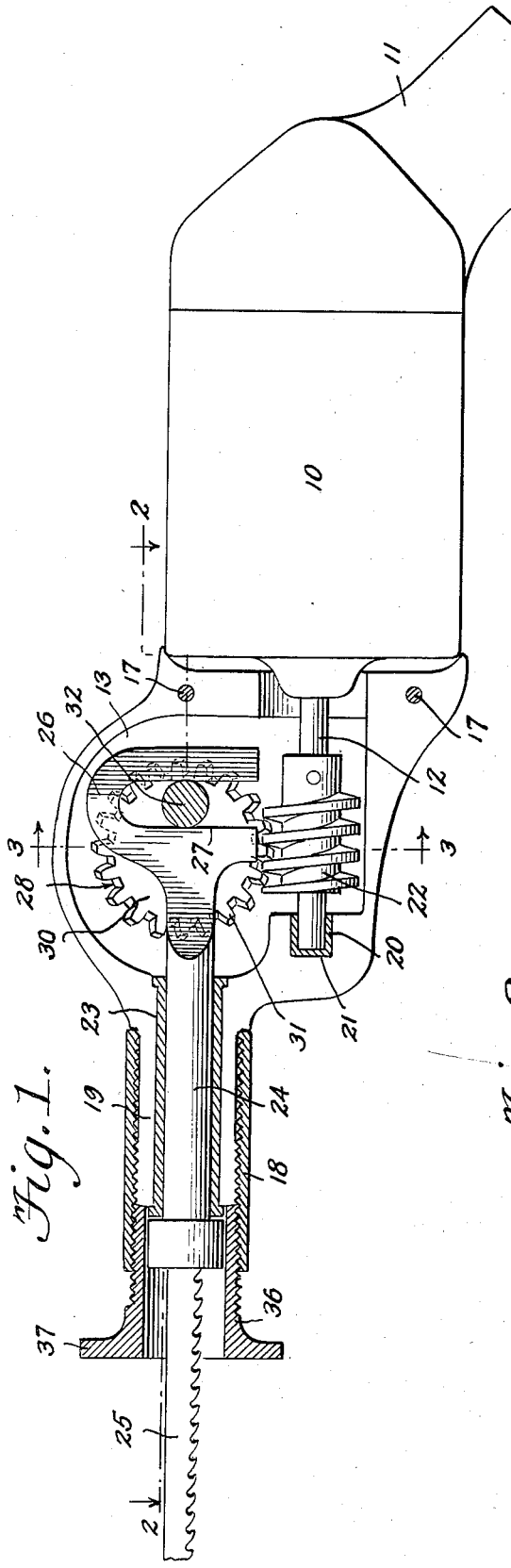
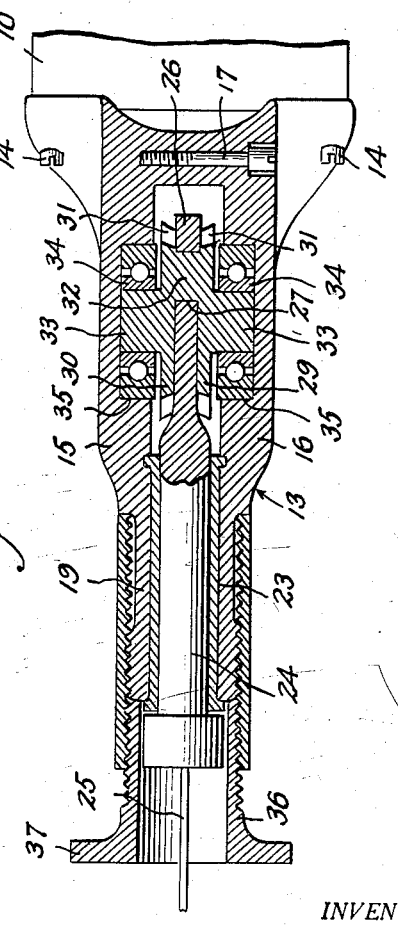
INVENTOR.
MURRAY A. WACHS
BY
Clark & Ott
ATTORNEYS Patented Jan. 5, 1943

2,307,174

UNITED STATES PATENT OFFICE 2,307,174

POWER TRANSMISSION GEARING

Murray A. Wachs, Brooklyn, N. Y.

Application December 13, 1941, Serial No. 422,887

5 Claims. (Cl. 74—50)

This invention has general relation to power transmission gearing and comprehends an improved gearing for converting rotary motion to reciprocatory motion, the same being applicable to a wide variety of uses, such as for compressors, power saws, power shears, power clippers or the like.

The invention primarily contemplates an improved power transmission gearing for converting rotary motion to reciprocatory motion by virtue of which a motor of low horsepower is capable of accomplishing the same work as that of a motor of many times greater horsepower, while vibration is practically eliminated and where an electric motor is employed as the prime mover, the sudden pull and strain thereon is obviated so that the starting is smooth and even.

More particularly the invention is directed to an improved power transmission gearing of the indicated character in which a driven rotary worm engages a worm wheel which is provided with parallel spaced coaxial portions formed with mating peripheral worm teeth meshing with circumferentially spaced portions of the worm and the portions of which worm wheel have outwardly projecting trunnions respectively concentric with said worm wheel portions with an eccentric crank pin located between and joining the worm wheel portions together with a member mounted for reciprocatory motion having a terminal at one end disposed between the worm wheel portions and operatively engaging the crank pin so as to equally distribute the driving strains and stresses on the worm to minimize vibration.

With the above enumerated and other objects in view, the invention is set forth in greater detail in the following specification and illustrated in the accompanying drawing in which:

Fig. 1 is a longitudinal sectional view through a power driven hand saw with the motor shown in side elevation and with the handle partly broken away.

Fig. 2 is a fragmentary longitudinal sectional view taken approximately on the line 2—2 of Fig. 1.

Fig. 3 is a transverse sectional view taken approximately on the line 3—3 of Fig. 1.

Referring to the drawing by characters of reference, 10 designates an electric motor housing provided at one end with a handle 11 and from which the motor shaft 12 protrudes forwardly into a casing or housing 13 which is anchored by screws 14 to the forward end of the motor 10. The casing or housing is vertically and longitudinally split to provide mating laterally separable sections 15 and 16 which are of identical construction and are clamped together by means of transverse screws 17 and an internally threaded sleeve 18 which surrounds the split cylindrical forward portion 19 of the casing or housing. The forward end of the motor shaft 12 is journaled in a bearing or bushing thimble 20 arranged within the mating concavities 21 in the casing sections, and the motor shaft 12 has secured thereto a worm 22 which is housed by the casing.

A cylindrical bushing 23 is arranged within the split cylindrical forward portion of the casing and has mounted therein for axial reciprocation a shank 24 which carries and has projecting forwardly therefrom a saw blade 25 or any equivalent reciprocatory tool or implement. The rear terminal 26 of the shank 24 is vertically slotted or notched as at 27 for a purpose to be hereafter set forth.

In order to transmit power from the rotary worm 22 and to convert the rotary motion to reciprocatory motion, a worm wheel unit is provided which is designated generally by the reference character 28. The worm wheel unit includes a pair of parallel spaced, coaxial worm wheels 29 and 30, each of which is formed with mating peripheral worm teeth 31 which mesh with the teeth of the worm 22 at circumferentially spaced portions thereof so as to equally distribute the driving strains and stresses on the worm wheel as it imparts power and motion thereto.

An eccentric crank pin 32 is disposed between and joins the worm wheels 29 and 30 so that the worm wheels together with the crank pin constitute the unit 28. Each of the worm wheels 29 and 30 is formed with a concentric outwardly projecting trunnion 33 which trunnions are in axial alignment and which are journaled in suitable ball or equivalent anti-friction bearings 34 arranged within the casing and mounted in bearing cavities 35 in the confronting faces of the casing sections 15 and 16. The slotted or notched rear shank terminal 26 extends between the worm wheels 29 and 30 of the worm wheel unit with the slot or notch 27 engaged by the crank pin 32 to effect reciprocations of the shank 24 and tool 25 when the motor is actuated to rotate the worm 22 and worm wheel unit 28.

As shown, the sleeve 18 may have threadedly engaged in its forward end a tubular guard extension 36 having an annular outwardly directed flange 37 so that the forward end of the shank is covered and protected.

Obviously, due to the fact that the slotted or notched terminal 26 of the shank is located between and guided by the parallel spaced coaxial worm wheels of the worm wheel unit, the driving stresses and strains are centralized and vibration is reduced to a minimum.

Constructed in this manner, it will be further seen that the axial center of the reciprocatory shank and tool is disposed in the same plane with the longitudinal axis of the motor shaft and worm thereby eliminating any lateral torque between the worm and eccentric crank pin as would occur if the eccentric crank pin were offset laterally.

What is claimed is:

1. In a power transmission gearing for converting rotary motion to reciprocatory motion, a driven rotary worm, a worm wheel unit having parallel spaced coaxial worm wheels formed with mating peripheral worm teeth meshing with circumferentially spaced portions of the worm, said worm wheels having outwardly projecting trunnions respectively concentric with said portions, and an eccentric crank pin joining the worm wheels, and a member mounted for reciprocatory motion including a terminal at one end disposed between the worm wheels and operatively engaging the crank pin of said unit.

2. In a power transmission gearing for converting rotary motion to reciprocatory motion, a driven rotary worm, a worm wheel unit including parallel axially spaced identical worm wheels each having a concentric outwardly projecting trunnion, said trunions being disposed in axial alignment and journaled for rotation on a common axis perpendicular to the axis of the worm, the peripheries of said worm wheels having mating peripheral worm teeth meshing with circumferentially spaced portions of the worm, an eccentric pin between and joining the worm wheels, a reciprocatory member, and means at one end thereof disposed between the worm wheels and operatively engaging the crank pin for effecting reciprocations of the member upon rotation of the worm wheel unit.

3. In a power transmission gearing of the character set forth, a driven worm, a worm wheel unit journaled on a concentric axis perpendicular to the axis of the worm and having a pair of worm wheels formed with mating sets of peripheral teeth adapted to respectively engage the teeth of the worm at circumferentially spaced portions thereof and a reciprocatory member eccentrically connected with the worm wheel unit between said pair of worm wheels.

4. In a power transmission gearing of the character set forth, a driven worm, a worm wheel unit journaled on a concentric axis perpendicular to the axis of the worm and having a pair of worm wheels formed with mating sets of peripheral teeth adapted to respectively engage the teeth of the worm at circumferentially spaced portions thereof and a reciprocatory member eccentrically connected with the worm wheel unit between said pair of worm wheels, said reciprocatory member having its axis of movement disposed in a plane parallel with the axis of the worm and the plane of the axis of movement of said reciprocatory member coinciding with a plane intermediate the width of the worm wheel unit.

5. In a power transmission gearing, a worm wheel unit having integral spaced parallel coaxial worm wheel portions formed with mating peripheral worm teeth meshing with circumferentially spaced portions of the teeth of the worm, said worm wheel portions having outwardly projecting integral trunnions respectively concentric with said portions and an eccentric crank pin integral with and joining the worm wheel portions.

MURRAY A. WACHS.